United States Patent [19]

Hewitt

[11] 4,305,549

[45] Dec. 15, 1981

[54] VALVE APPARATUS AND METHOD FOR CONTROLLING FLOW TO AN END GUN OF A PIVOT IRRIGATION APPARATUS

[76] Inventor: Ronnie D. Hewitt, Rte. 1, Oakley, Id. 83346

[21] Appl. No.: 124,194

[22] Filed: Feb. 25, 1980

[51] Int. Cl.³ ............................................. B05B 3/12
[52] U.S. Cl. ............................ 239/177; 239/DIG. 1; 239/710
[58] Field of Search ......... 239/177, 710, 717, DIG. 1; 251/231

[56] References Cited

U.S. PATENT DOCUMENTS 3,352,493  11/1967  Curtis ................................. 239/177
3,921,908  11/1975  Zimmerer ........................... 239/177
4,228,955  10/1980  Petersen ............................. 239/177

Primary Examiner—James B. Marbert
Attorney, Agent, or Firm—H. Ross Workman; J. Winslow Young; Allen R. Jensen

[57] ABSTRACT

A valve apparatus and method for controlling flow of water to an end gun of a pivot irrigation apparatus. An actuator mechanism for the valve apparatus includes a horizontally mounted, downwardly extended contact bar interconnected by a mechanical linkage to the valve. Contact posts are selectively positioned at preselected intervals along the path of travel of the pivot irrigation apparatus at locations where they will be engaged by the contact bar to rotate the same. The rotational movement of the contact bar is translated by the mechanical linkage into a corresponding rotation of the valve.

11 Claims, 2 Drawing Figures

VALVE APPARATUS AND METHOD FOR CONTROLLING FLOW TO AN END GUN OF A PIVOT IRRIGATION APPARATUS

BACKGROUND

1. Field of the Invention

This invention relates to valve apparatus for pressurized irrigation systems and, more particularly, to a valve apparatus and method for controlling flow of water to an end gun of a pivot irrigation system.

2. The Prior Art

Within the past few decades, pressurized irrigation systems have been developed to allow for distribution of water to food and forage crops on lands which would otherwise be unsuitable for irrigation farming due to insufficient water, undulating or otherwise unsuitable terrain, etc. Various pressurized irrigation systems are known and include stationary systems, laterally movable systems, and pivotal systems. Of the foregoing, the pivotal system is generally preferred since it is essentially automatic and does not require periodic lateral shifting of the irrigation system to distribute the water uniformly over a relatively larger sector of land.

The conventional pivot irrigation system consists of an elevated, wheel-mounted conduit with a plurality of sprinklers mounted thereto at spaced locations. One end of the pivot irrigation system is connected through a swivel joint to a source of pressurized water. The wheels of the system are driven by electrical motors and each set of wheels along the length of the conduit are turned at a predetermined rate to accommodate pivotal movement of the pivot irrigation system in circular path around the central swivel. The overall pivot irrigation system is generally hundreds of feet long and will serve to distribute thousands of gallons of water in a single sweep over a large circular area consisting of many acres.

Since the outer or opposite end of the pivot irrigation system moves across a greater arcuate distance and since it is usually desirable to extend the area of coverage of the pivot irrigation system as much as possible, it is common practice to mount a large nozzle apparatus on the end of the pivot irrigation system. This large nozzle apparatus is called an "end gun" and is configurated to dispense substantially larger volumes of water than any of the individual sprinklers along the length of the pivot irrigation system. However, this large volume of water dispensed by the end gun is known to be wasteful as well as detrimental under certain conditions. For example, if the end of the pivot irrigation apparatus passes adjacent an uncultivated field or roadway, the water distributed thereto is wasted.

Although a limited amount of water waste can be tolerated, damage resulting from uncontrolled water distribution can be a serious problem. For example, certain crops in the adjacent field may be ruined by being watered at the wrong time. Also, the water deluge has been known to undermine, flood, and otherwise erode adjacent roadways. The deluge from the end gun has also been a causative factor for damage resulting from accidents involving vehicular traffic travelling along the adjacent roadway.

For these latter reasons, local governmental bodies have legislated restrictions on the operation of pivot irrigation systems adjacent roadways. The value of the pivot irrigation system is thereby lowered since its use in an essentially automatic mode is restricted. For example, an operator is frequently required to be in attendance when the movement of the pivot irrigation apparatus brings the end gun adjacent the roadway. The operator must be present to shut off the end gun and, subsequently, turn the end gun on again when the movement of the system carries the end gun away from the roadway. While this particular method of operation is feasible, it is (1) undesirable, (2) results in wasted man hours, and (3) tends to be unreliable.

In view of the foregoing, it would be an improvement in the art to provide a control apparatus for controlling the flow of water to the end gun of a pivot irrigation system. It would also be an improvement in the art to provide a control valve apparatus and method for controlling the flow of water to an end gun of a pivot irrigation apparatus wherein the flow of water is automatically stopped and started at predetermined locations in the arcuate sweep of the pivot irrigation apparatus. Such a novel apparatus and method is disclosed and claimed herein.

BRIEF SUMMARY AND OBJECTS OF THE INVENTION

The present invention relates to a novel end gun valve apparatus and method for controlling the flow of water to the end gun of a pivot irrigation apparatus. The valve apparatus includes a control valve interposed in the conduit upstream of the end gun. The valve apparatus also includes structure to accommodate its being opened and closed by an actuator mechanism. The actuator mechanism includes a downwardly depending shaft terminating in a horizontal contact bar. Vertical contact posts are placed at predetermined locations along the arcuate path of the pivot irrigation apparatus. As selectively predetermined, each post is struck by the contact bar to either open or close the valve apparatus thereby selectively controlling the flow of water to the end gun.

It is, therefore, a primary object of this invention to provide improvements in pivot irrigation systems.

Another object of this invention is to provide an improved method for controlling the flow of water to an end gun of a pivot irrigation system.

Another object of this invention is to provide a control valve for the end gun of a pivot irrigation system wherein the actuation of the control valve is selectively predetermined by placement of generally vertical posts adjacent the arcuate path of travel of the pivot irrigation apparatus.

Another object of this invention is to provide an actuator mechanism for a valve wherein rotational movement of the actuator mechanism less than ninety degrees of arc is translated into about ninety degrees of arc of a valve body in the valve.

These and other objects and features of the present invention will become more fully apparent from the following description and appended claims taken in conjunction with the accompanying drawing.

DETAILED DESCRIPTION OF THE PREFERRED EMBODIMENTS

Figure 1:
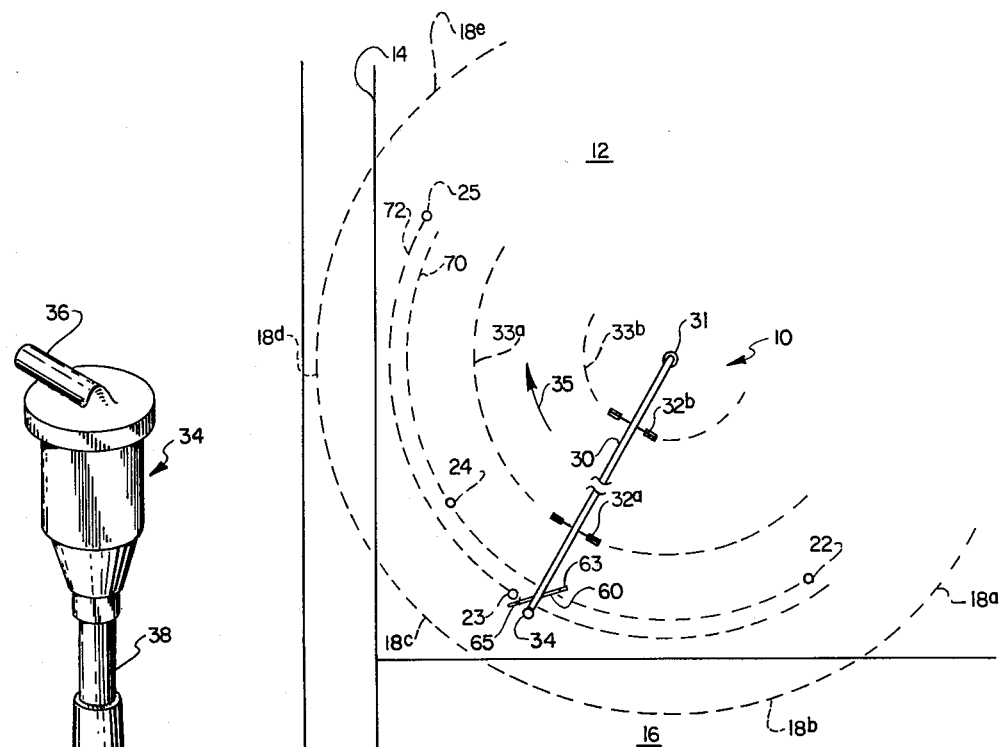
FIG. 1 is a schematic plan view of a conventional pivot irrigation apparatus schematically illustrating the environment for the novel apparatus and method of this invention.

The invention is best understood by reference to the drawing wherein like parts are designated with like numerals throughout.

Figure 2:
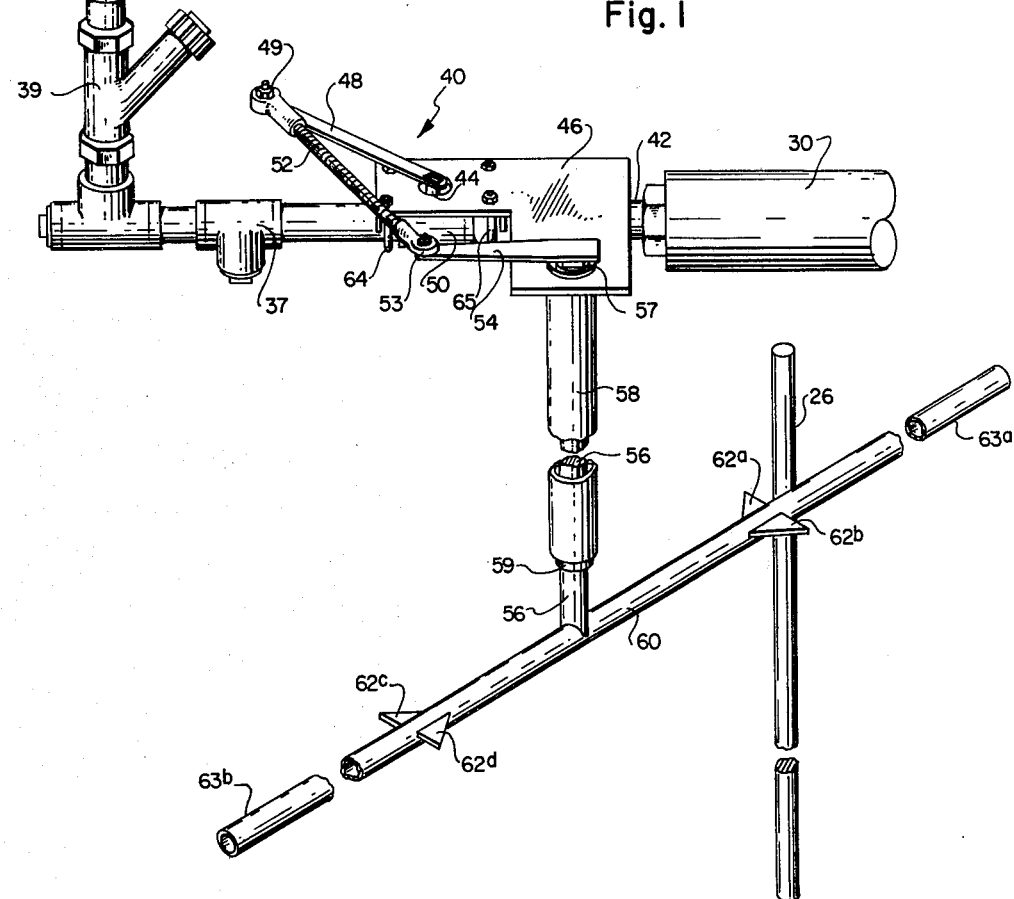
FIG. 2 is a perspective view of the control valve apparatus of this invention.

Referring now more particularly to FIG. 1, a conventional pivot irrigation apparatus is shown generally at 10 and includes a wheel-mounted, pressurized water conduit 30 adapted to orbit about a pivotal center formed at a swivel 31 located in an irrigated field 12. The opposite end of conduit 30 terminates in an end gun apparatus 34 (see also FIG. 2) with the flow of water thereto being controlled by a valve apparatus 40 (FIG. 2). The operation of valve apparatus 40 is selectively controlled by movement of a contact bar 60 as will be discussed more fully hereinafter.

Pivot irrigation apparatus 10 is only schematically illustrated herein for purposes of simplicity in setting forth the environment of the present invention. For example, conduit 30 is shown greatly foreshortened and mounted on only two wheel sets, wheel sets 32a and 32b, although it should be clearly understood that pivot irrigation apparatus 10 is any suitable, conventional pivot irrigation apparatus known in the art.

In operation, pivot irrigation apparatus 10 moves in a circular path about swivel 31 in a direction indicated by arrow 35 with wheel set 32a following an arcuate path 33a and wheel set 32b following arcuate path 33b. It is, of course, readily acknowledged that the foreshortening effect of conduit 30 alters the relative location of swivel 31 so that in reality, the curvature of each of arcuate paths 33a and 33b would correspond to the exact location of pivot 31. However, since the overall operation of pivot irrigation apparatus 10 is substantially the same regardless of the number of wheel sets thereon, no attempt has been made to accurately depict any single, conventional pivot irrigation apparatus.

Pivotal movement of pivot irrigation apparatus 10 causes end gun apparatus 34 to move in an arcuate path around swivel 31 and distribute water to an outer limit indicated schematically by broken, arcuate line 18a–18e. As it will be clearly seen, line 18a–18e extends into an adjacent, vacant field 16, line segment 18b, as well as a major portion of an adjacent roadway 14, line segment 18d. In the absence of a suitable valve mechanism for end gun apparatus 34, the entire annulus described at its outer limit by broken line 18a–18e would receive its full complement of water from end gun apparatus 34. However, a plurality of contact posts 22–25 are spaced in irrigated field 12 at such positions so as to selectively cause horizontal rotational movement of contact bar 60 as pivot irrigation apparatus 10 moves through its arcuate path indicated by arrow 35. For example, post 22 is selectively preset to stop flow of water to end gun 34. Continued movement of pivot irrigation apparatus 10 brings contact bar 60 into contact with contact post 23, thereby permitting water to again flow to end gun apparatus 34 so that water is again distributed to irrigated field 12 as indicated by broken line 18c. Continued movement of pivot irrigation apparatus 10 causes contact bar 60 to next strike contact post 24 again shutting off end gun apparatus 34 so that water is prevented from being distributed along line segment 18d and over the adjacent roadway 14. Continued movement of pivot irrigation apparatus 10 brings contact bar 60 into contact with contact post 25 so that water is again allowed to flow to end gun apparatus 34, the water again being distributed along an external periphery indicated by broken line 18e.

It will be noted that contact posts 22 and 24 are placed at preselected locations along an arcuate path indicated by broken line 70 and serve as shutoff contact posts for shutting off the flow of water to end gun apparatus 34. Correspondingly, contact posts 23 and 25 are placed at preselected locations along an imaginary arcuate line shown by broken line 72 for the purpose of opening valve 50 (FIG. 2), again permitting water to flow to end gun apparatus 34.

Referring now more particularly to FIG. 2, end gun apparatus 34 is shown in greater detail and, more particularly, sufficient detail is illustrated to accommodate the thorough understanding of the on/off features of the apparatus and method of this invention. In particular, conduit 30 terminates in a conventional pipe 43 supporting a valve apparatus 40. A drain tee 37, a conventional filter apparatus 39, and a riser 38 terminating in a nozzle 36 complete the water conduit downstream of valve apparatus 40. Valve apparatus 40 includes a conventional ball valve 50 interconnected to a valve handle 48 by a valve stem 44.

Valve handle 48 is pivotally joined by pivot 49 to a thrust arm 52. Thrust arm 52 is pivotally connected at pivot 53 to lever arm 54. Lever arm 54 is rigidly joined at swivel 57 to a rotatable shaft 56. Shaft 56 is rotatably mounted inside a hollow column 58 by bushings 57 and 59 and is rigidly interconnected to contact bar 60. A plate 46 serves as a mounting plate for mounting hollow column 58 to pipe 42 by means of U-bolts 64 and 65 clamped on each side of valve 50.

Contact bar 60 has ends 63a and 63b with detents 62a and 62b mounted adjacent end 63a while detents 62c and 62d are mounted adjacent end 63b.

Contact bar 60 is shown in contact with contact post 24 and is being partially rotated in a counterclockwise direction with the object of closing valve 50. The counterclockwise rotation of contact bar 60 rotates shaft 56 counterclockwise and, correspondingly, lever arm 54 in the same direction. Counterclockwise movement of lever arm 54 provides thrust to thrust arm 52 causing valve handle 48 to be moved also in a counterclockwise direction transmitting a corresponding counterclockwise rotation to valve stem 44 thereby closing valve 50. Advantageously, the offset placement of shaft 56 relative to valve stem 44 and the rigid and adjustable interconnection provided by thrust arm 52 between lever arm 54 and valve handle 48 provides the appropriate mechanical advantage to impart at least a 90° rotational movement to valve stem 44 upon incrementally less than 90° rotational movement of contact bar 60. Since valve 50 is configurated as a conventional ball valve, the appropriate 90° rotation of valve stem 44 moves the valve body therein (not shown) between complete closed and open positions.

In better understanding the reverse operation, visualize contact bar 60 as having been rotated counterclockwise to a position approximately 90° from the position illustrated. Subsequent contact with an appropriate contact post, such as contact posts 23 or 25, moves contact bar 60 in a clockwise rotational direction. This clockwise rotational movement is transmitted through the mechanical linkages of lever arm 54, thrust arm 52, and valve handle 48 so that a corresponding clockwise rotation is imparted to valve stem 44 thereby opening valve 50. With valve 50 open, water is again directed to end gun apparatus 34.

Detents 62a–62d serve to inhibit the respective contact posts, contact posts 22–25, from sliding along the length of contact bar 60 under the forces encountered during contact. However, after having caused the appropriate rotation of contact bar 60, the respective contact posts slide off either of ends 63a and 63b thereof.

In summary, the novel apparatus and method of the present invention readily accommodates a conventional pivot irrigation apparatus 10 for selectively controlling the flow of pressurized water to end gun apparatus 34. For example, when the pivot irrigation apparatus 10 is established in an irrigated field 12, the appropriate close and open positions for contact posts 22–25 serve as triggers therefor and are established along the path of travel of pivot irrigation apparatus 10 so as to provide the appropriate contact posts for contact bar 60. Once established, pivot irrigation apparatus 10 is essentially automatic in that the flow of pressurized water to end gun apparatus 34 is selectively controlled at the appropriate times to substantially minimize the unwanted distribution of water to the adjacent field 16 and/or the adjacent roadway 14.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A valve actuator apparatus for an end gun of a pivot irrigation apparatus comprising:
    valve means upstream of the end gun;
    actuator means for opening and closing the valve means, the actuator means comprising a lever means interconnected between a rotatable shaft and said valve means, the lever means comprising a valve handle connected to the valve means, a lever arm connected to the rotatable shaft with a rigid thrust arm interconnecting the valve handle with the lever arm so that angular movement of the lever arm upon rotation of the shaft is translated into corresponding angular movement of the valve handle, the rotatable shaft including a contact bar operable to be actuated by the trigger means;
    pivot means for the valve means comprising a first pivot means and the rotatable shaft comprising a second pivot means, the second pivot means being offset from the first pivot means to thereby accomodate rotation of the first pivot means through approximately 90° of arc upon rotation of the second pivot means through a predetermined arc less than 90° of arc; and
    trigger means for operating the actuator means to open and close the valve means upon arcuate movement of the pivot irrigation apparatus.

2. The valve actuator apparatus defined in claim 1 wherein the valve means comprises a ball valve means including a valve body adapted to operate between open and closed positions upon rotation of the valve body through an arcuate distance of approximately 90° degrees.

3. The valve actuator apparatus defined in claim 1 wherein the trigger means comprises a first upright located at a first, predetermined position in the arcuate path traversed by the pivot irrigation apparatus and a second upright located at a second, predetermined position in the arcuate path traversed by the pivot irrigation apparatus, the first upright serving as said trigger means to close said valve means upon contact with said actuator means during pivoted movement of said pivot irrigation apparatus, the second upright serving as said trigger means to open said valve means upon contact with said actuator means during continued pivotal movement of said pivot irrigation apparatus.

4. An end gun valve apparatus for a pivot irrigation system comprising:
    valve means upstream of an end gun;
    a valve handle for the valve means, the valve handle opening and closing the valve means when moved through a predetermined arcuate distance;
    an actuator mechanism interconnected to the valve handle and operable to move the valve handle through said predetermined arcuate distance, the actuator means comprising a contact bar mounted to a rotatable shaft, the shaft supporting the contact bar in a generally horizontal position so as to be in a position to contact a contact post means and upon contact be rotated in a horizontal plane and transmit said rotation to said shaft, a lever arm rigidly mounted to the shaft, a rigid thrust arm pivotally interconnected between said lever arm and said valve handle so that said rotational movement of said shaft is translated into a corresponding rotational movement of said valve handle thereby operating said valve means; and
    contact post means comprising a plurality of contact posts, each contact post being adapted to be mounted at a predetermined position on the ground to accomodate actuating the actuator mechanism when the actuator mechanism is brought into contact therewith upon pivotal movement of the pivot irrigation system so that the actuator mechanism moves the valve handle through said predetermined arcuate distance.

5. The end gun valve apparatus defined in claim 4 wherein the thrust arm includes adjustment means for adjustably altering the length of the thrust arm and the pivotal center for the shaft is offset from the pivotal center for the valve means so that a mechanical advantage is obtained for rotational movement of the shaft relative to the valve means.

6. A control valve apparatus for an end gun of a pivot irrigation apparatus comprising:
    a valve means upstream of the end gun, the valve means having a valve stem connected to a valve handle, the valve means being operable between an open configuration to a closed configuration upon rotation of the valve handle and the valve stem through an arc of about 90°, the valve stem being rotatable in a plane about a vertical axis;
    an elongated shaft extending vertically downwardly from the plane of rotation of the valve handle to a predetermined position above the ground and terminating adjacent the middle of a horizontal, extended contact bar, the shaft being rotatable about its vertical axis, the upper end of the shaft interconnected to a lever arm;
    a rigid linkage interconnecting the valve handle to the lever arm; and
    a plurality of contact posts placed at predetermined positions adjacent the path of travel of the elongated shaft, each contact post being selectively oriented to contact the contact bar to selectively open or close the valve means by causing the contact bar to rotate the shaft and thereby impart a corresponding rotational movement to the linkage, valve handle, and valve stem.

7. The control valve apparatus defined in claim 6 wherein the contact bar comprises detents spaced outwardly and providing engagement sites to inhibit the contact post from sliding along the contact bar.

8. The control valve apparatus defined in claim 6 wherein the rigid linkage comprises an adjustable rod.

9. The control valve apparatus defined in claim 6 wherein the pivotal center for the shaft is offset from the pivotal center for the valve stem to assist in providing a mechanical advantage to the shaft so that rotation of the shaft through an arc incrementally less than 90° of arc will be translated into a rotational movement of the valve stem of at least 90° of arc.

10. A valve actuator apparatus for an end gun of a pivot irrigation system comprising:
    an end gun mounted to the end of the pivot irrigation apparatus;
    a valve means upstream of the end gun;
    a support plate mounted to the valve means;
    a hollow column mounted to the support plate and extending downwardly therefrom to a predetermined position above the ground;
    a shaft rotatably mounted in the hollow column, the shaft extending below the hollow column and terminating in a horizontally oriented contact bar, the upper end of the shaft extending an incremental distance above the support plate and rigidly interconnected to a lever arm;
    a valve handle connected to the valve means and operable to open and close the valve means upon arcuate movement of the valve handle;
    a rigid strut interconnecting the valve handle with the lever arm to transmit arcuate movement of the lever arm to the valve handle; and
    a plurality of contact posts spaced at predetermined positions relative to the path of travel of the pivot irrigation apparatus to accommodate contact with the contact bar and rotational movement of the shaft with a corresponding rotational movement of the valve stem.

11. A method for controlling the flow of water to an end gun of a pivot irrigation system comprising:
    placing a valve means in the pivot irrigation system upstream of the end gun, the valve means controlling flow of water to the end gun;
    supporting an actuator mechanism for the valve means adjacent the valve means, said actuator means comprising a rotatable shaft in an offset relationship to the valve means as part of the actuator mechanism, the offset relationship imparting a mechanical advantage to the actuator mechanism, the rotatable shaft extending downwardly below the valve means, the actuator means also comprising a contact bar at the lower end of the rotatable shaft;
    interconnecting the valve means to the actuator mechanism with a mechanical linkage;
    rotating the rotatable shaft by pivotally turning the contact bar by setting at least two contact post means in a vertical orientation at predetermined locations adjacent the arcuate path of travel of the end gun of the pivot irrigation system and in a position to be contacted by the contact bar of the actuator mechanism thereby selectively closing and opening the valve means, depending upon location of the contact post means relative to the position of the actuator mechanism, the valve means thereby controlling the flow of water to the end gun.

* * * * *

UNITED STATES PATENT AND TRADEMARK OFFICE
CERTIFICATE OF CORRECTION

PATENT NO. : 4,305,549

DATED : December 15, 1981

INVENTOR(S) : Ronnie D. Hewitt

It is certified that error appears in the above-identified patent and that said Letters Patent are hereby corrected as shown below:

Column 1, line 33, after "in" insert --a--;
Column 4, line 17, change "43" to --42--; and
Column 5, line 65, change "90°" to --90--.

Signed and Sealed this

Sixteenth Day of March 1982

[SEAL]

Attest:

GERALD J. MOSSINGHOFF

Attesting Officer     Commissioner of Patents and Trademarks